(No Model.)
2 Sheets—Sheet 1.
J. T. CRUSH.
HEAD BLOCK FOR SAW MILLS.
No. 259,102. Patented June 6, 1882.
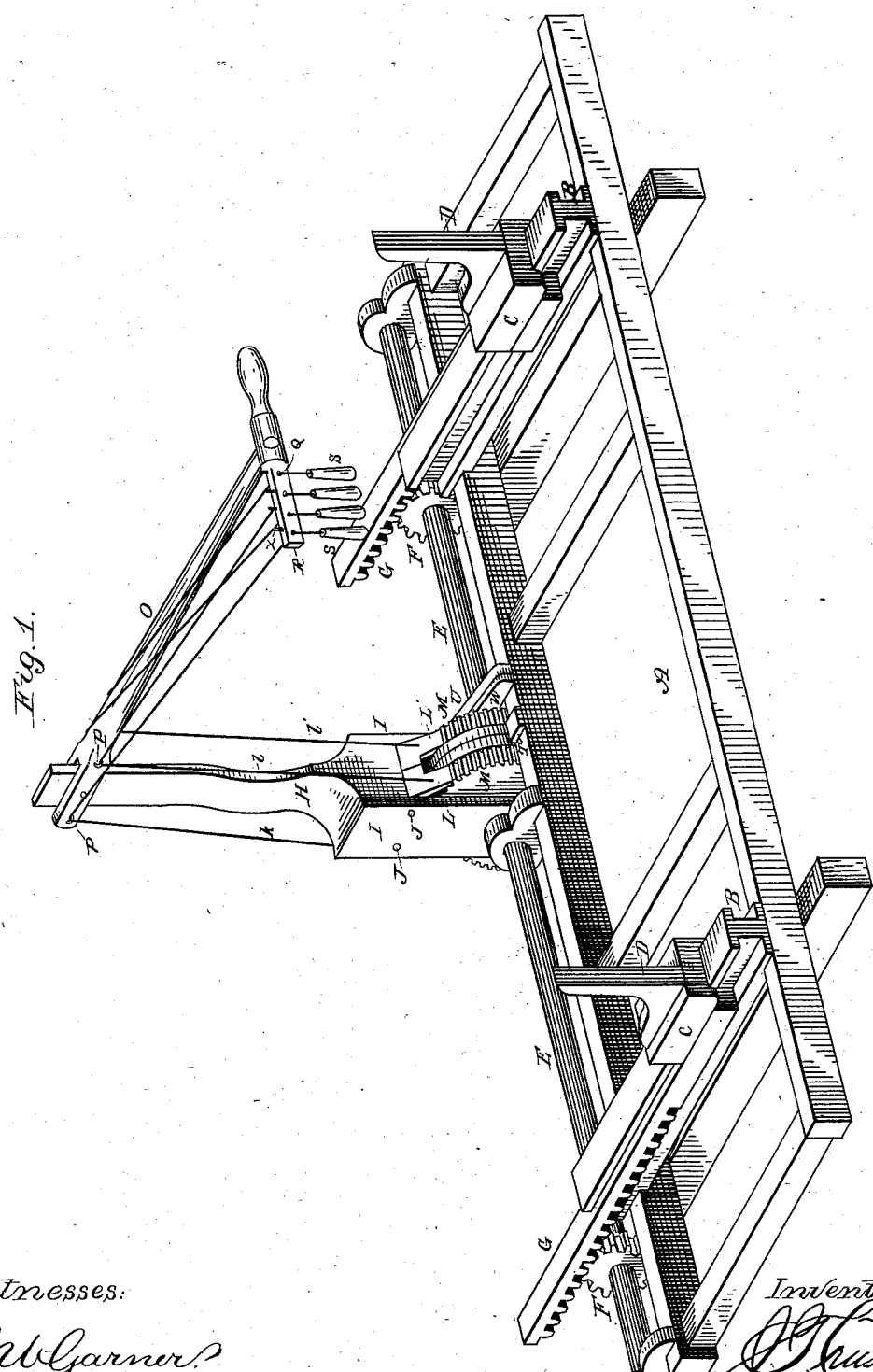

(No Model.) 2 Sheets—Sheet 2.
J. T. CRUSH.
HEAD BLOCK FOR SAW MILLS.
No. 259,102. Patented June 6, 1882.
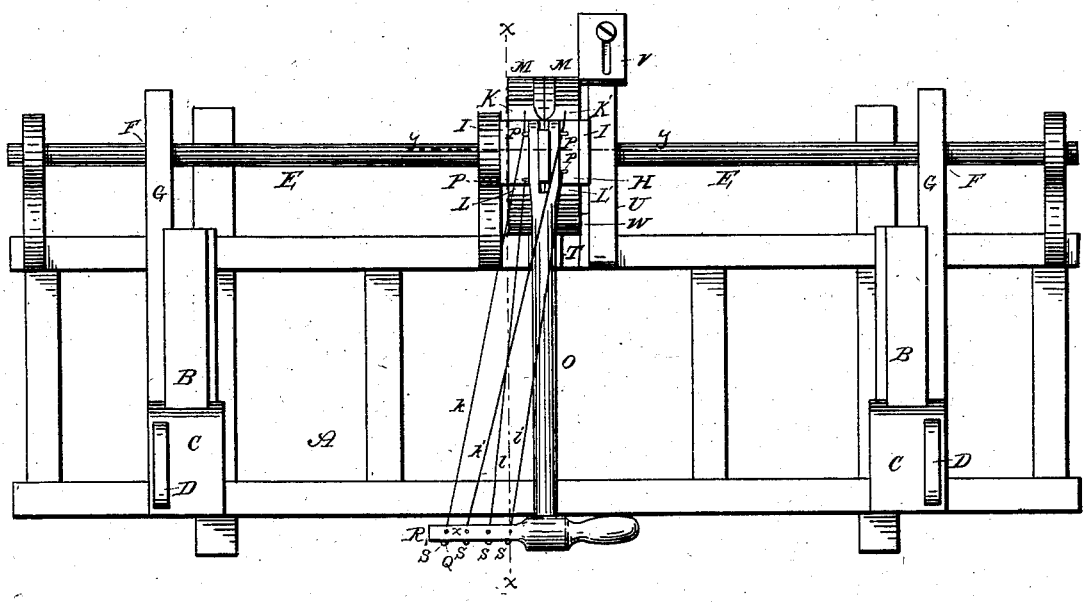
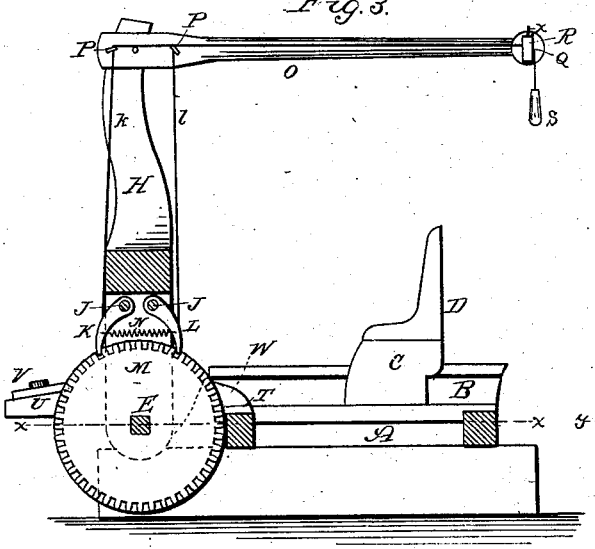
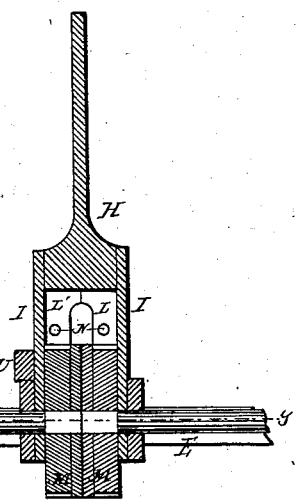

UNITED STATES PATENT OFFICE.

JOHN T. CRUSH, OF FINCASTLE, VIRGINIA, ASSIGNOR OF ONE-HALF TO D. P. CRUSH, OF SAME PLACE.

HEAD-BLOCK FOR SAW-MILLS.

SPECIFICATION forming part of Letters Patent No. 259,102, dated June 6, 1882.

Application filed January 27, 1882. (No model.)

*To all whom it may concern:*

Be it known that I, JOHN T. CRUSH, of Fincastle, in the county of Botetourt and State of Virginia, have invented certain new and useful Improvements in Head-Blocks for Saw-Mills; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a top plan. Fig. 3 is a section on the line $x\,x$, Fig. 2; and Fig. 4 is a section on the line $y\,y$, Fig. 2.

Corresponding parts in the several figures are denoted by like letters of reference.

This invention relates to head-blocks for saw-mills; and it consists in certain improvements in the construction of the same, whereby by means of a single lever the sliding knees may be operated independently or simultaneously, so as to move either or both ends of the log, as will be hereinafter fully described, and particularly pointed out in the claims.

In the drawings hereto annexed, A represents the carriage, and B B the head-blocks, which may be T-shaped in cross-section, so as to be clamped by the slides C, carrying the knees D.

E E are longitudinal shafts, journaled in suitable bearings at the ends and middle of the carriage, and having pinions F engaging racks G, connected to the slides C, so that by operating the shafts the sliding knees may be moved in either direction upon the head-blocks.

H is a lever, forked at its lower end and pivoted, as shown, upon the inner or adjoining ends of the shafts E E. The prongs or legs I I of lever H are connected by pins or shafts J J, upon which are pivoted dogs or pawls K K′ L L′, facing in opposite directions and engaging gear-wheels M, secured upon the inner ends of the shafts E, and straddled by the forked lever H. The dogs or pawls above referred to are kept in contact with the gear-wheels by suitably-arranged springs, which may be ordinary coiled springs, N, connecting respectively the pawls K L and K′ L′.

To the upper end of lever H is pivoted another lever, O, serving as a handle by means of which the said lever H may be conveniently operated by the sawyer.

$k\,k'\,l\,l'$ are cords or chains attached to the pawls K K′ L L′, and passed through eyes P at the pivoted end of lever O, and through perforations Q in a cross-bar, R, at the free end of said lever, the ends of said cords being provided with handles S, by which they may be conveniently manipulated, so as to disengage any of the pawls or dogs from the gear-wheels with which they are in contact.

T T are friction blocks or cushions, arranged to bear against the gear-wheels M for the purpose which will be presently described.

Upon a bracket, U, which is attached to the carriage, and which may form one of the bearings for one of the shafts E, is secured a stationary stop, W, and a slotted adjustable stop, V, by which the movement of the lever H may be limited and regulated.

The operation of my invention will be readily understood from the foregoing description, taken in connection with the drawings hereto annexed.

By disengaging either or both of the pawls L L′ from the gear-wheels M and operating the lever H, the shaft or shafts E may be turned so as to move the sliding knees in a forward direction and feed the log toward the saw any required distance at each stroke. While the lever is moved back the gear-wheels M are held stationary by the friction blocks or cushions T. When the pawls K K′ are disengaged from the gears the shaft or shafts may be turned in the opposite direction.

The cross-bar R, at the end of lever O, may be provided with pins or studs X, upon which the cords may be secured to keep any or all of the pawls or dogs disengaged from the gear-wheels M.

I am aware of the patent to Albertson, No. 151,738, June 9, 1874, and I claim nothing therein shown.

Having thus described my invention, I claim and desire to secure by Letters Patent of the United States—

1. The combination, with the shafts E, having gear-wheels M, of the forked lever H, the pawls or dogs K K′ and L L′, the springs N, the lever O, hinged to the upper end of lever H, and having eyes P and cross-bar or handle R, provided with perforations Q, and the cords k k' l l', attached to the dogs or pawls K K' L L', and passed through the eyes P and perforations Q, said cords being provided with handles S, as and for the purpose set forth.

2. The combination of the shafts E, having gear-wheels M, the lever H, having pawls K K' L L', engaging said gear-wheels, the springs N, mechanism, substantially as described, for manipulating the pawls K K' L L' to release one or more of them, so that the shaft or shafts may be turned by the combined action of the lever H and the remaining pawls, and the friction blocks or cushions T, arranged to bear against the gear-wheels M to prevent the latter and shafts E from turning when the lever H is moved back, as set forth.

In testimony that I claim the foregoing as my own I have hereto affixed my signature in presence of two witnesses.

JOHN THOMAS CRUSH.

Witnesses:
BENJAMIN HADEN,
R. C. FIGGOT.